United States Patent [19]

Fang

[11] Patent Number: 5,405,515
[45] Date of Patent: Apr. 11, 1995

[54] METHOD AND APPARATUS FOR PRODUCTION OF A CARBON NITRIDE

[76] Inventor: Pao-Hsien Fang, 156 Common St., Belmont, Mass. 02178

[21] Appl. No.: 108,066

[22] Filed: Aug. 17, 1993

[51] Int. Cl.⁶ .................. H05F 3/04; C01B 31/00; C01B 21/30
[52] U.S. Cl. ........................... 204/164; 204/173; 204/178
[58] Field of Search ............... 204/164, 173, 178

[56] References Cited

U.S. PATENT DOCUMENTS

| | | | |
|---|---|---|---|
| 4,569,738 | 2/1988 | Kieser et al. | 204/173 |
| 4,767,608 | 8/1988 | Matsumoto et al. | 204/173 |
| 5,002,646 | 3/1991 | Egerton et al. | 204/178 |

Primary Examiner—John Niebling
Assistant Examiner—Kishor Mayekar
Attorney, Agent, or Firm—Richard J. Birch

[57] ABSTRACT

A method and apparatus for the production of a form of carbon nitride with a chemical formula consisting of 3 carbon atoms and 4 nitrogen atoms, and a structure similar to that of beta-silicon nitride. The apparatus utilizes a nitrogen ion beam and a carbon arc. The interaction between the ionized nitrogen and the carbon evoluted in the arc produces copious compounds of carbon and nitrogn. Enrichment of the proportion of the specific carbon-nitrogen compound is achieved by adjustment of the operational parameters of the apparatus. A pure form of this compound is produced by an electric and/or magnetic field separator.

19 Claims, 1 Drawing Sheet

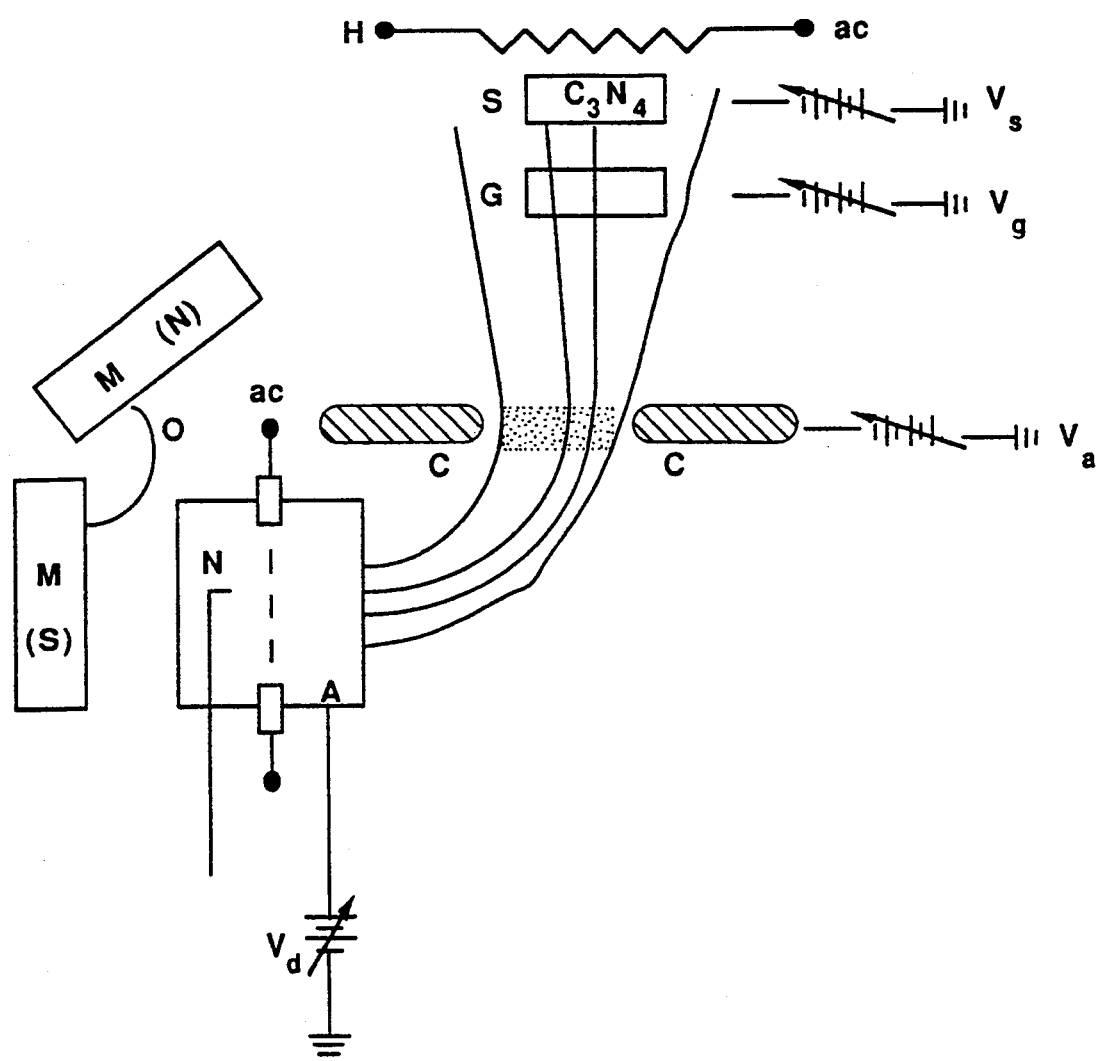

METHOD AND APPARATUS FOR PRODUCTION OF A CARBON NITRIDE

BACKGROUND OF THE INVENTION

A form of carbon nitride, with a chemical formula of $C_3N_4$ and with a structure of beta-$Si_3N_4$ has been theoretically formulated and predicted to have a mechanical hardness harder than that of diamond, the hardest material known today (A. Y. Liu and M. L. Cohen, Physical Review, B 41,1027; 1990). An experimental result by Ming Y. Chen et al has partially supported the hardness prediction.

A material with a hardness superior to that of diamond is of a great utility. From production point of view, while the growth temperature of diamond is preferably in the vicinity of 1000 degrees Celsius, the result of Chen et al indicates that this compound can be formed on a substrate held at ambient temperature. This freedom from a high temperature requirement should greatly extend the adaptability of this compound to a larger number of substrate materials.

Based on empirical relations between the mechanical hardness and the optical band gap, this compound should have a wide energy band and a transparency from the ultraviolet to the infrared light. Similar correlation also implies a favorable electrical transport property for electronics applications.

The method to produce this carbon nitride by Chen et al is based on a sputtering on a carbon target with nitrogen ion bombardment. The resultant material, according to their spectroscopic evaluation, consists of only about 50% or less of this component in a matrix of other forms of carbon and nitrogen compounds. These auxiliary materials do not share the superior property of this compound and should be minimized or eliminated, but the method of these authors does not have this provision. One of the objectives of the present invention is to provide a dispersion in the system to separate this compound from other mixed materials while in the deposition. The resultant material becomes 100% pure from this provision.

SUMMARY OF THE INVENTION

Carbon nitride, specifically $C_3N_4$ with beta $Si_3N_4$ structure is produced by injecting ionized nitrogen into the arc region of a carbon arc. The specific carbon nitride is separated by a mass and charge analyzer with a magnetic and/or electric field.

BRIEF DESCRIPTION OF THE DRAWING

The single Figure illustrates in schematic form a carbon arc, a nitrogen injection, magnetic separator and substrate collector for $C_3N_4$.

DETAILED DESCRIPTION OF THE INVENTION

The carbon nitride of this invention, specifically $C_3N_4$ with beta $Si_3N_4$ structure will be referred to herein as the "Specific Carbon Nitride Compound". The method to produce this compound is based on a combination of a carbon arc and a nitrogen plasma. The ionized nitrogen is injected into the arc region of the carbon arc. The temperature of carbon from the arc exceeds 2000K, in combination with the highly active nitrogen ion from the plasma, forms a highly energetic configuration and various nitrogen and carbon compounds will be produced. The specific carbon nitride is separated by a mass and charge analyzer with magnetic and/or electric field. For a given field configuration, the position of various compounds in the dispersed carbon-nitrogen ion beam can be located. Therefore, the Specific Carbon Nitride Compound with 100% purity can be collected by a deposition onto a substrate or onto a material to be coated.

Referring to the schematic of the single Figure, the components are identified as follows: (A) anode, (G) grid, (H) heater, (M) magnet pair (South and North), (S) substrate, ($V_d$) discharge voltage; ($V_g$) grid voltage, ($V_s$) biased voltage on substrate (theta) magnetic inclination angle, (N) nitrogen gas inlet jet, and (C) carbon arc.

In operation, the two principal components are (1) the sustenance of the carbon arc, with an arc voltage of typically 20 volts with a superficial contact between two carbon rods, and (2) a dc discharge voltage of around 200 volts between the carbon rods and the anode. This low value of discharge voltage is made possible by the assistance of a magnetic field generated by the magnet pair (M).

The procedure of operation commences with the ignition of a carbon arc in a nitrogen gas ambient of about 0.1 torr pressure. The carbon arc produces ionized carbon and electrons. The electrons, in colliding with nitrogen molecules, facilitate a dissociation of nitrogen molecules to form a nitrogen plasma. The inclination angle between the two magnets (M), with an intensity of around 1000 gauss each, is adjusted so that the carbon arc is surrounded by the nitrogen plasma sheath to induce reaction between the carbon ions and the nitrogen ions to form carbon nitride. The inclination angle, depending on the desired deposition station, is typically 1200°.

The nitrogen inlet in the system is a nitrogen jet injected into the carbon arc region. The hydrodynamic force of the jet, in combination with a magnetic confinement through a helix motion of the colliding ions produces an ion beam and maintains this beam for a distance longer than the mean free path of the ions. While the mean free path at 0.1 torr vacuum is only millimeters, the present configuration produces a beam of centimeters in length, thus produces a convenient working area. This working area can be further increased by a differential pumping barrier to provide a high vacuum in the beam path from the low vacuum region, such as commonly used in the reactive evaporation.

The ion beam containing both visible and invisible spectra, corresponding to various carbon and nitrogen compositions, is dispersed by a magnetic field such that a region of the pure Specific Carbon Nitride Compound is produced. One diagnostic way to determine this region is by a deposition of the dispersed beam on a wide, optically transparent substrate. By locating the region on the substrate which shows the characteristic absorption spectra, such as 2216 $cm^{-1}$ the triplet bond of carbon nitride, the working station is established.

An additional separation and an improved collection efficiency can be achieved by applying an electric field on a grid in front of the substrate or a biased field on the substrate itself. The grid configuration is preferable when the substrate is insulating material.

At the work station, the substrate can take the form of tools to be coated. The tools can be rotated to have a uniform coating through the whole body of the tool.

For electronic and optical applications, the substrate, either in a planar form and lens or dome shape, can be stationary or rotationally coated accordingly.

The method and apparatus of the present invention can be utilized to produce other carbon related materials. Several examples are:

1. Diamond is known to form favorably from the carbon hydride. Hydrogen can be incorporated through a replacement of the nitrogen gas inlet by a hydrogen gas inlet.
2. There are various metallic carbides which are technologically important. The metallic component can be introduced into the gas inlet by their corresponding gaseous compound such as silane for silicon to form silicon carbide, germane for germanium carbide, organometallic compound for titanium carbide, tungsten carbide, etc. The organometallic compound can be either gas or liquid with high vapor pressure.

Another modification is to replace the carbon rod by other materials, for example, using silicon rod to produce a silicon arc. This arc, in combining with organometallic plasma of tungsten, platinum etc., can produce tungsten silicide, platinum silicide, etc. These materials are useful as infrared detectors and are difficult to form by conventional reactive evaporation.

Conventional carbon rods are positioned in a vertical line or perpendicular to each other in a vertical plane. Because the tip of silicon rods will be in a molten state during the operation, they are positioned in a line or in 90 degrees, all in a horizontal plane.

A modification of the apparatus separates the arc and plasma portions. The plasma unit, using tungsten wire or thin graphite rod as hot filament, injects the plasma beam to the arc region. This modified system allows the two units to operate independently.

Having described in detail a preferred embodiment of my invention, it will now be obvious to those skilled in the art that numerous modifications can be made therein without departing from the scope of the invention as defined in the following claims.

What I claim is:

1. An apparatus for the production of a compound from an arc component and a plasma component, said apparatus comprising:
   means for producing an arc of a first component of the compound in an ionized gas containing a second component of the compound, said ionized gas being contained within a reaction chamber;
   means for producing a plasma of the second component of the compound with said reaction chamber; and,
   means for combining said arc and plasma to produce the compound.
2. The apparatus of claim 1 further comprising means for extracting the compound from the combined arc and plasma.
3. The apparatus of claim 2 wherein said extraction means includes means for establishing a magnetic field with respect to the combined arc and plasma.
4. The apparatus of claim 2 wherein said extraction means includes means for establishing an electromagnetic field with respect to the combined arc and plasma.
5. The apparatus of claim 2 wherein said extraction means includes means for establishing an electric field with respect to the combined arc and plasma.
6. The apparatus of claim 2 wherein said extraction means includes means for depositing the compound on a substrate.
7. The apparatus of claim 6 further comprising means for establishing an electric field between the substrate and the combined arc and plasma.
8. The apparatus of claim 6 further comprising means for establishing an electric bias on said substrate.
9. The apparatus of claim 1 wherein said means for producing a plasma of a second component produces a plasma of an organometallic gas.
10. The apparatus of claim 1 wherein said means for producing an arc of a first component produces a carbon arc, wherein said means for producing a plasma of a second component produces a plasma of nitrogen gas, and wherein said compound is Specific Carbon Nitride Compound.
11. The apparatus of claim 1 wherein said means for producing an arc of a first component produces a carbon arc, wherein said means for producing a plasma of a second component produces a plasma of silane, and wherein said compound is silicon carbide.
12. The apparatus of claim 1 wherein said means for producing an arc of a first component produces a carbon arc, wherein said means for producing a plasma of a second component produces a plasma of germane, and wherein said compound is germanium carbide.
13. The apparatus of claim 1 wherein said means for producing an arc of a first component produces a carbon arc, wherein said means for producing a plasma of a second component produces a plasma of organometallic titanium, and wherein said compound is titanium carbide.
14. The apparatus of claim 1 wherein said means for producing an arc of a first component produces a carbon arc, wherein said means for producing a plasma of a second component produces a plasma of organometallic tungsten, and wherein said compound is tungsten carbide.
15. The apparatus of claim 1 wherein said means for producing an arc of a first component produces a silicon arc, wherein said means for producing a plasma of a second component produces a plasma of organometallic tungsten, and wherein said compound is tungsten silicide.
16. The apparatus of claim 1 wherein said means for producing an arc of a first component produces a silicon arc, wherein said means for producing a plasma of a second component produces a plasma of organometallic platinum, and wherein said compound is platinum silicide.
17. A method for producing a compound from an arc component and a plasma component, said method comprising the steps of:
   (A) producing an arc of a first component of the compound in an ionized gas containing a second component of the compound, said ionized gas being contained within a reaction chamber;
   (B) producing a plasma of the second component of the compound within said reaction chamber; and,
   (C) combining the arc and plasma to produce the compound.
18. The method of claim 17 further comprising the step of extracting the compound from the combined arc and plasma.
19. The method of claim 18 further comprising the step of depositing the extracted compound on a substrate.

* * * * *